(12) United States Patent
Connor

(10) Patent No.: US 6,430,628 B1
(45) Date of Patent: Aug. 6, 2002

(54) METHOD AND APPARATUS FOR REDUCING DIRECT MEMORY ACCESS TRANSFERS USING SMART COALESCING

(75) Inventor: Patrick Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/207,461

(22) Filed: Dec. 8, 1998

(51) Int. Cl.[7] .................. G06F 3/00; G06F 13/28
(52) U.S. Cl. .................. 710/5; 710/23; 710/56
(58) Field of Search .................. 710/4, 5, 23, 25, 710/37, 56, 57

(56) References Cited

U.S. PATENT DOCUMENTS

| | | | | | |
|---|---|---|---|---|---|
| 4,433,374 A | * | 2/1984 | Hanson et al. | ............... | 711/138 |
| 5,218,678 A | * | 6/1993 | Kelleher et al. | ............... | 710/5 |
| 5,307,459 A | * | 4/1994 | Petersen et al. | ............ | 709/250 |
| 5,412,782 A | * | 5/1995 | Hausman et al. | ........... | 709/250 |
| 5,485,584 A | * | 1/1996 | Hausman et al. | ............. | 710/22 |
| 5,488,724 A | * | 1/1996 | Firoozmand | ............... | 709/212 |
| 5,717,952 A | * | 2/1998 | Christiansen et al. | ......... | 710/22 |
| 5,822,618 A | * | 10/1998 | Ecclesine | .................... | 710/57 |
| 5,828,901 A | * | 10/1998 | O'Toole et al. | ............... | 710/22 |
| 5,857,114 A | * | 1/1999 | Kim | ........................... | 395/842 |
| 5,878,217 A | * | 3/1999 | Cherukuri | .................... | 709/212 |
| 5,961,614 A | * | 10/1999 | Christiansen | ................. | 710/22 |
| 6,065,071 A | * | 5/2000 | Priem et al. | .................. | 710/22 |
| 6,081,854 A | * | 6/2000 | Priem et al. | .................. | 710/37 |
| 6,105,079 A | * | 8/2000 | Kuo et al. | ..................... | 710/25 |
| 6,130,759 A | * | 10/2000 | Blair | ......................... | 358/1.17 |
| 6,145,016 A | * | 11/2000 | Lai et al. | ....................... | 710/4 |

FOREIGN PATENT DOCUMENTS

JP  355157052 A  * 12/1980

* cited by examiner

Primary Examiner—Thomas Lee
Assistant Examiner—Chun Cao
(74) Attorney, Agent, or Firm—Kenyon & Kenyon

(57) ABSTRACT

One embodiment of the invention comprises a method and apparatus for managing data transfers from memory to an input/output device where the data is stored in memory as data fragments. A first list of memory locations for the fragments is received. A sub-set of fragments for copying to at least one of a first and second buffer is selected based on fragment size. A request to copy the selected sub-set of fragments to the at least one first and second buffer is sent. A request to lock down any unselected fragments is sent. A second list of memory locations for the fragments is created. The second list comprises memory locations for the at least one first and second buffer and locked down fragments.

21 Claims, 8 Drawing Sheets

METHOD AND APPARATUS FOR REDUCING DIRECT MEMORY ACCESS TRANSFERS USING SMART COALESCING

FIELD OF THE INVENTION

The invention relates to device drivers in general. More particularly, the invention relates to a method and apparatus for managing the transfer of data from memory to an input/output (I/O) device using smart coalescing.

BACKGROUND OF THE INVENTION

Local area networks (LANs) are attractive to many small to mid-size companies due to their performance and cost efficiency. A LAN typically comprises a number of personal computers (PCS) connected by some sort of transmission medium such as fiber optic cable. Each PC is equipped with a Network Interface Card (NIC). The NIC manages the flow of information between the PC and the network using, among other things, a media access control (MAC) protocol. Recently, a new MAC protocol was introduced that substantially increases data transfer speeds, which is defined in the Institute of Electrical and Electronics Engineers (IEEE) standard 802.3z titled "Supplement to Information Technology—Local and Metropolitan Area Networks—Part 3: Carrier Sense Multiple Access with Collision Detection (CSMA/CD) Access Method and Physical Layer Specifications—Media Access Control Parameters, Physical Layers, Repeater and Management Parameters for 1,000 Mb/s Operation," Jun. 20, 1996 ("Gigabit Ethernet").

Gigabit Ethernet is a packet based protocol. This means that information that is to be transferred from one PC to another PC is broken down into packets which are communicated over the transmission medium under the control of the respective PC's NIC. A typical packet may contain several fragments, such as one from the Data Link Layer, one for the Network Layer, one for the Transport layer, one for the payload, and so forth. For example a Transport Control Protocol/Internet Protocol (TCP/IP) packet over Ethernet will generally have an Ethernet header fragment of 14 bytes, an IP header fragment of 20 bytes, a TCP header fragments of 20 bytes, and one or two data payload fragments of 1–1460 bytes. Each fragment is stored somewhere in memory prior to transmission by the NIC.

Prior to transmitting a packet the NIC must read each packet fragment from its respective location in memory. The NIC relies upon a number of PC sub-systems to accomplish this process, namely the memory sub-system and the peripheral component interconnect (PCI) sub-system. The PC sub-systems are coordinated by a device driver supporting the NIC. The method the device driver employs to manage the PC sub-systems directly impacts the speed at which the NIC can read the packet fragments and transmit the packet to the network. Consequently, a substantial need exists for optimizing the device driver to improve network transfer speeds.

Optimization of the NIC device driver is particularly important for Gigabit Ethernet networks. Gigabit Ethernet operates at speeds of 1000 Megabits per second (Mbps). In full duplex at 100% of wire speed the throughput of a Gigabit Ethernet NIC is about 250 megabytes per second (Mbps). This is significantly faster than the potential data transfer speeds of the PCI sub-system used in conventional PCS, which typically have 32 bit PCI slots operating at 33 Megahertz (MHZ). Therefore, maximizing the bandwidth of the PCI sub-system is crucial to achieving high throughput for a Gigabit Ethernet system.

There are currently two general methods that attempt to maximize the bandwidth of the PCI sub-system. In both methods, the network operating system (NOS) sends a first list to the NIC device driver. The first list contains a location (e.g, memory address) for each fragment stored in host memory. The NIC device driver then generates a second list using information contained in the first list and sends the second list to the NIC. The NIC then reads each fragment from memory via direct memory access (DMA) transfers in accordance with the second list.

One difference between the two methods is the number of DMA transfers required for the NIC to read each packet fragment. In the first method, the driver receives the first list and copies each fragment to a buffer, which is typically referred to as a coalesce buffer. The driver stores the memory location for the coalesce buffer in the second list and sends the second list to the NIC. The NIC then retrieves the contents of the buffer using a single DMA transfer and transmits the data. In the second method, the driver receives the first list and generates a second list corresponding to the first list without any memory-to-memory copies. Since the second list is made up completely of NOS owned memory, the driver must "lock-down" each fragment so that the fragment data is not moved in physical memory by the NOS before or during the DMA. The NIC then retrieves each fragment from its memory location using a separate DMA transfer for each fragment. Each fragment is unlocked once it has been read by the NIC.

Certain advantages and disadvantages are associated with each method. The first method uses a single DMA transfer and therefore minimizes the associated latency. The first method, however, heavily burdens the memory sub-system since a memory-to-memory copy must be made for each fragment. Further, copying larger fragments may take longer than simply using a single DMA transfer. In addition, retrieval of the fragments cannot begin until copying is complete. With respect to the second method, the burden on the memory sub-system is alleviated, but multiple DMA transfers are necessary which shifts the burden to the PCI sub-system and increases the overall DMA latency time. This becomes particularly problematic for smaller fragments since each DMA has an associated overhead latency for bus arbitration regardless of the fragment size. Further, the second method must lock-down each fragment prior to transfer. This further delays the fragment retrieval process.

In view of the foregoing, it can be appreciated that a substantial need exists for a NIC device driver that solves the above-discussed problems.

SUMMARY OF THE INVENTION

One embodiment of the invention comprises a method and apparatus for managing data transfers from memory to an input/output device where the data is stored in memory as data fragments. A first list of memory locations for the fragments is received. A sub-set of fragments for copying to at least one of a first and second buffer is selected based on fragment size. A request to copy the selected sub-set of fragments to the at least one first and second buffer is sent. A request to lock down any unselected fragments is sent. A second list of memory locations for the fragments is created. The second list comprises memory locations for the at least one first and second buffer and locked down fragments.

DETAILED DESCRIPTION

One embodiment of the invention includes a method and apparatus for managing a PCI sub-system and memory sub-system for a PC to increase NIC transmit efficiency. In this embodiment of the invention, the memory sub-system comprises one or more machine-readable media (e.g., dynamic read-only memory (DRAM)) and memory management software. The PCI sub-system includes a PCI bus and the appropriate software.

Efficiently managing the PCI and memory sub-systems is particularly advantageous at Gigabit Ethernet speeds because of the throughput demands it places on both sub-systems. Improved transmit efficiency frees up bandwidth for packet reception and helps prevent receive first-in-first-out (FIFO) overrun.

It is worthy to note that any reference in the specification to "one embodiment" or "an embodiment" means that a particular feature, structure, or characteristic described in connection with the embodiment is included in at least one embodiment of the invention. The appearances of the phrase,"in one embodiment" in various places in the specification are not necessarily all referring to the same embodiment.

This embodiment of the invention overcomes the limitations of conventional techniques by selectively copying fragments into a coalesce buffer based on the size of adjacent fragments. This selective copying minimizes DMA transfers while avoiding large memory latencies. The time it takes to copy a fragment depends on several factors, such as whether the fragment is stored in a cache, fragment size, speed of the memory, and so forth. This embodiment of the invention takes advantage of the fact that memory copy latency depends on the fragment size, while the latency to initiate a DMA read is size-independent. Smaller adjacent fragments are coalesced while DMA transfers from "locked down" NOS memory are performed for larger fragments. This minimizes DMA transfers without overburdening the memory subsystem, which means that PCI bandwidth will be used more efficiently during packet transmissions. This also minimizes fragment lock-downs which minimize the latency associated with each lock-down.

This embodiment of the invention manages data transfers from memory to an input/output device, such as a NIC. Data is stored in memory as data fragments. A NIC device driver receives a fragment list. The fragment list contains memory locations for each fragment. The device driver selects certain fragments for copying to one or more coalesce buffers. The unselected fragments are locked-down in physical memory. The memory locations for the coalesce buffers and the locked-down fragments are stored in a DMA transfer list. The DMA transfer list is sent to a DMA controller. The DMA controller initiates DMA transfers for the coalesce buffers and locked-down fragments in accordance with the DMA transfer list.

Figure 1:
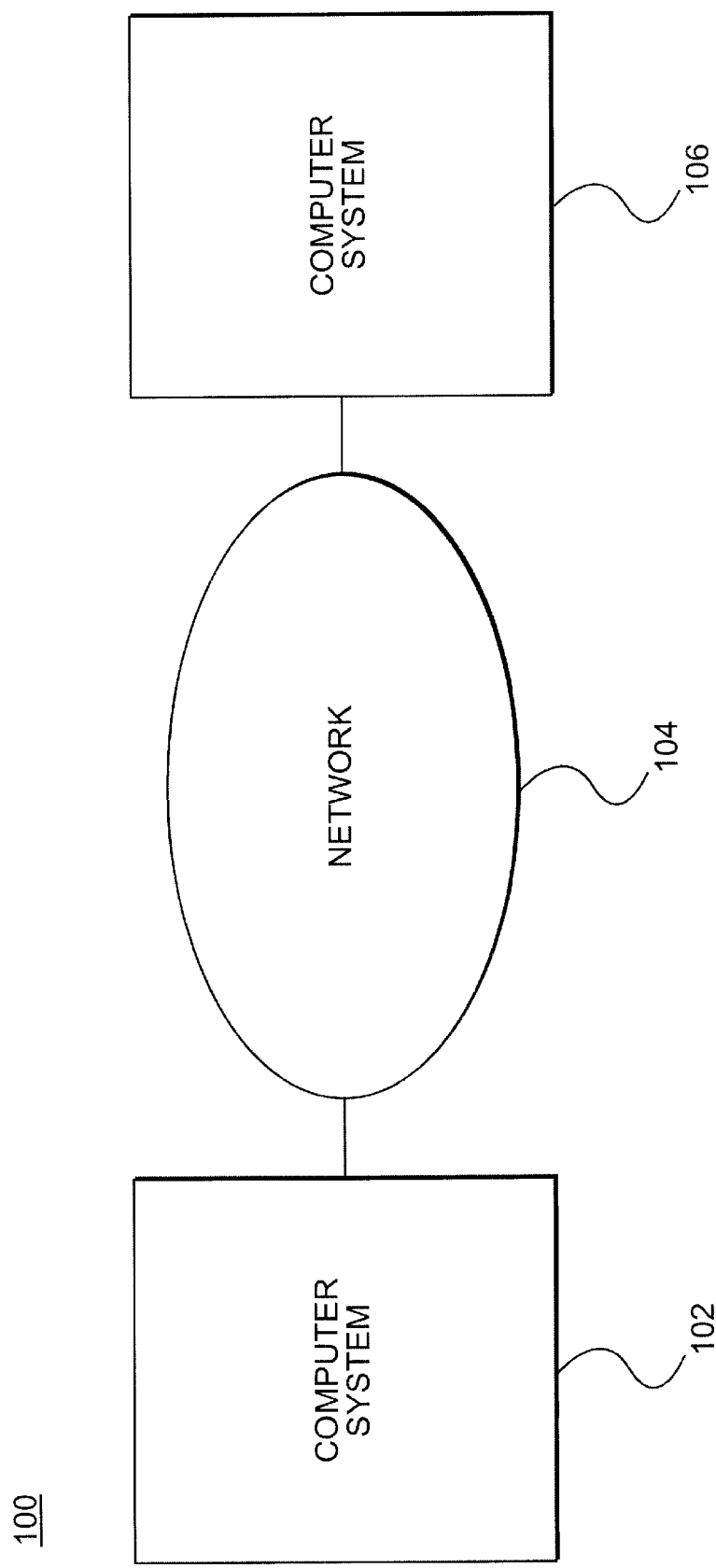
FIG. 1 is a block diagram for a Gigabit Ethernet network.

Referring now in detail to the drawings wherein like parts are designated by like reference numerals throughout, there is illustrated in FIG. 1 a simple Gigabit Ethernet network 100. Network 100 comprises a computer system 102 and a computer system 106, both of which are connected via network 104. It is worth noting that network. 100 is for illustrative purposes only, and that a person of ordinary skill in the art will recognize that any network configuration can be used and still fall within the scope of the invention. In operation, systems 102 and 106 are network devices that communicate information between each other over network 104 in accordance with the Gigabit Ethernet standard. Systems 102 and 106 will be further described with reference to FIG. 2.

Figure 2:
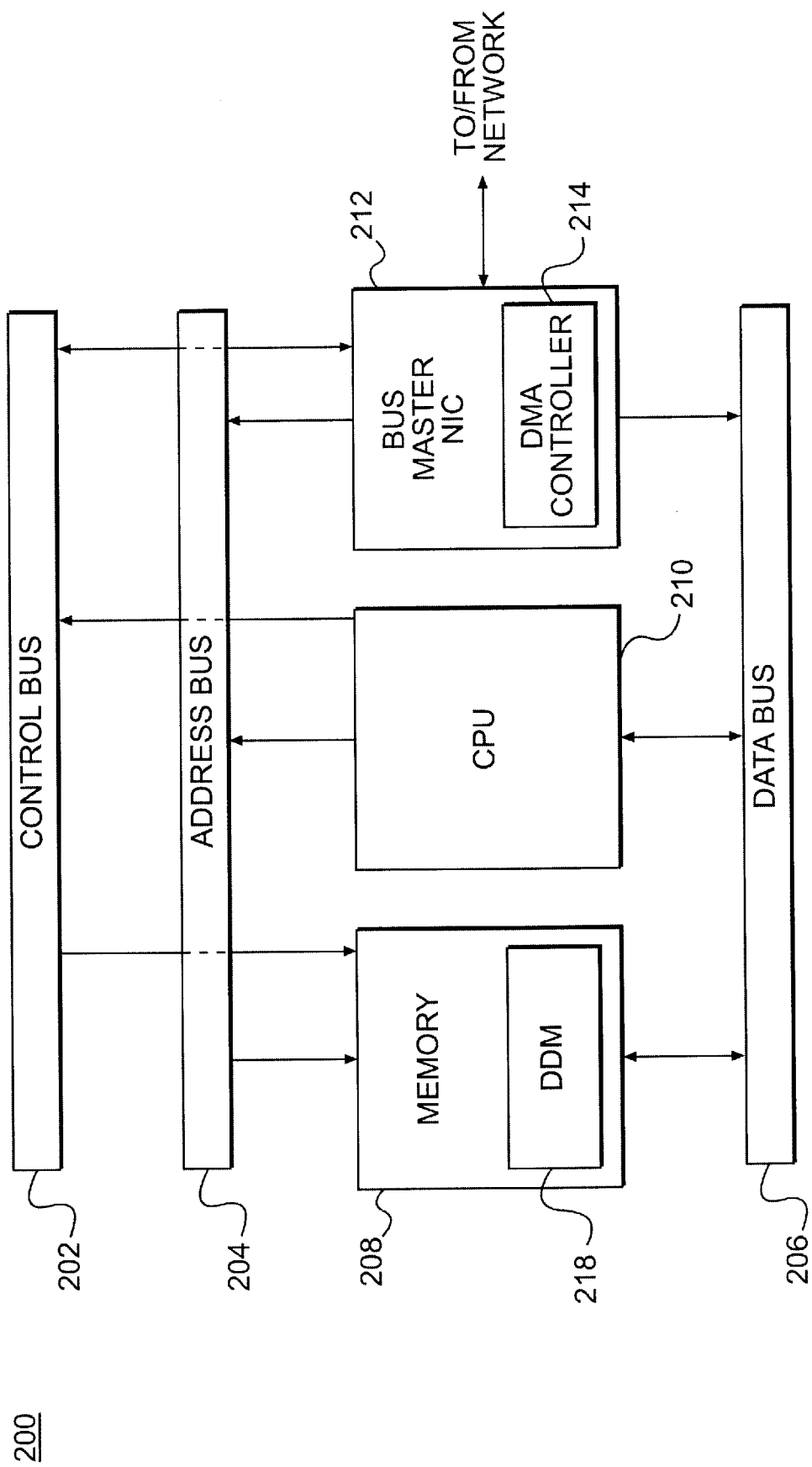
FIG. 2 is a block diagram for a computer system suitable for practicing one embodiment of the present invention.

FIG. 2 illustrates a computer system suitable for practicing one embodiment of the present invention. FIG. 2 shows a computer system 200 representative of computer systems 102 and 106. Computer system 200 comprises a processor 210, a memory 208, a bus master network interface card (NIC) 212, and a DMA controller 214, each of which is connected to a control bus 202, an address bus 204 and a data bus 206.

In one advantageous embodiment of the invention, computer system 200 is a microprocessor-based PC system. NIC 212 is a NIC that adheres to the Gigabit Ethernet standard. Memory device 208 may be any suitable computer readable memory device such as one or more dynamic random access memory (DRAM) devices. Processor 210 may be any suitable means for supporting NIC 216 such as a general purpose microprocessor such as the Pentium®, Pentium Pro, Pentium II, or Xeon® made by Intel Corporation. Data bus 206 may be any bus suitable for digital signal transfer and such as a PCI bus. DMA controller 214 may be any suitable DMA device for transferring data from memory 208 to NIC 212.

Memory 208 stores computer program segments that when executed by a processor (e.g., processor 210) perform the functionality for this embodiment of the invention. In this embodiment of the invention, the computer program segments are collectively referred to as device driver module (DDM) 218. It can be appreciated, however, that the functions performed by this module can be further separated into more modules, or be distributed throughout the system, and still fall within the scope of the invention. Further, although this embodiment of the invention implements the functionality of this module in software, it can be appreciated that the functionality of this module may be implemented in hardware, software, or a combination of hardware and software. The operation of module 218 will be described in further detail with reference to FIG. 3.

Figure 3:
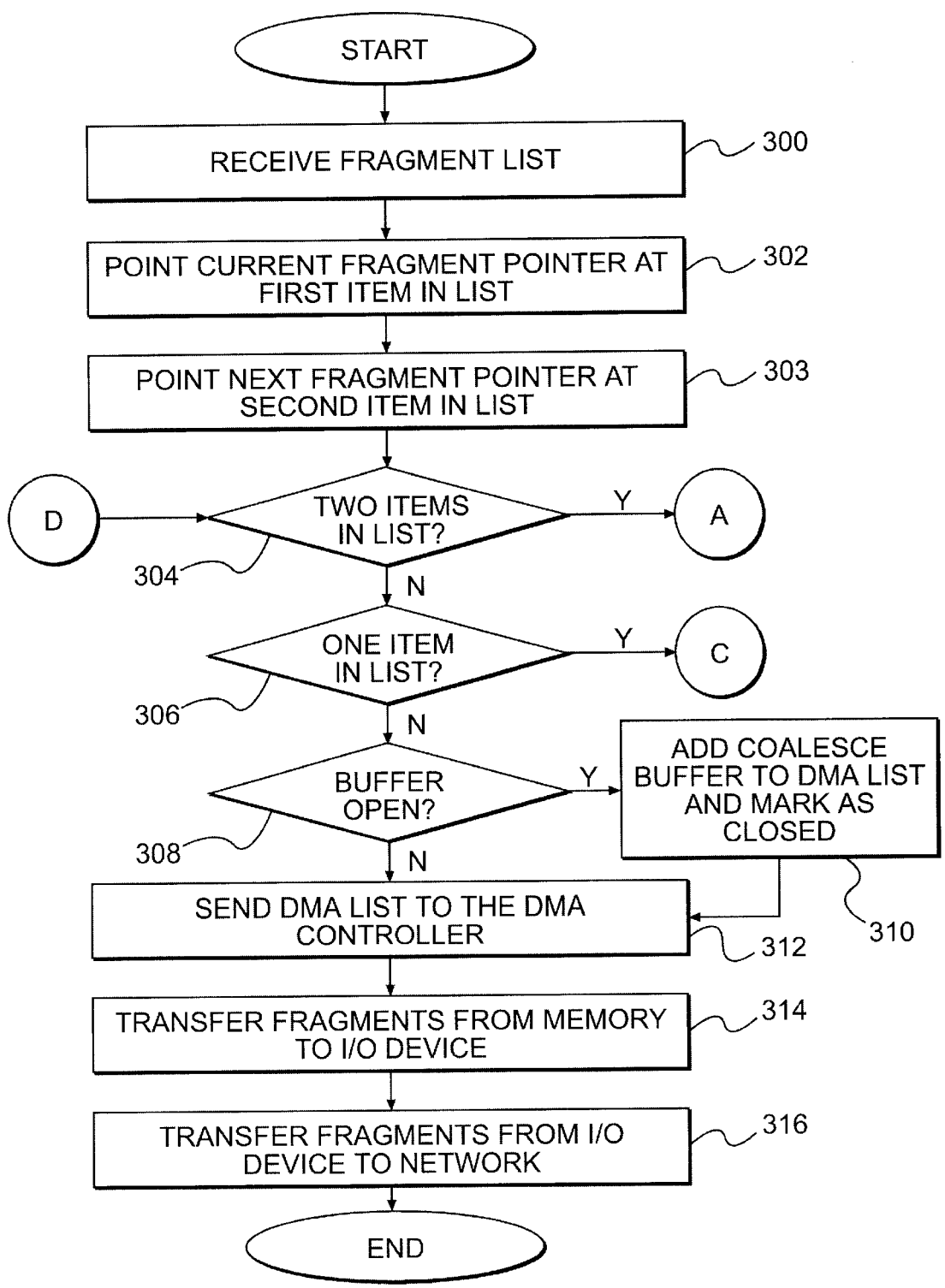
FIG. 3 is a first block flow diagram of the steps performed by a device driver in accordance with one embodiment of the invention.

FIG. 3 is a first block flow diagram of the steps performed by a device driver in accordance with one embodiment of the invention. As shown in FIG. 3, DDM 218 receives a fragment list at step 300. DDM 218 points a current fragment pointer at the first fragment in the list at step 302. The first fragment is also referred to herein as the "current fragment." DDM 218 points a next fragment pointer at the second item in the list at step 303. The second fragment is also referred to herein as the "next fragment." DDM 218 then determines whether there are at least two items left in the list to process at step 304. If there are less than two items left in the list to be processed, DDM 218 determines whether there is at least one item left in the list to process at step 306. If there is not at least one item left in the list to process at step 306, then DDM 218 determines whether a coalesce buffer is open at step 308. If a buffer is open at step 308, the buffer is added to a DMA transfer list and marked as closed at step 310.

If there are two items left in the list to process at step 304, then control is passed to step 402 (shown in FIG. 4) as indicated by designator A. If there are less than two items left in the list to process at step 304, but at least one item left in the list to process at step 306, then control is passed to step 502 (shown in FIG. 5) as indicated by designator C.

Once all the fragments from the received fragment list have been (1) copied to a coalesce buffer or (2) locked-down in memory, the DMA list is sent to DMA controller 214 at step 312. DMA controller 214 transfers the fragments from memory 208 to NIC 212 using DMA transfers at step 314. NIC 212 then forms the transferred fragments into one or more packets and sends the packets to network 104 at step 316.

Figure 4:
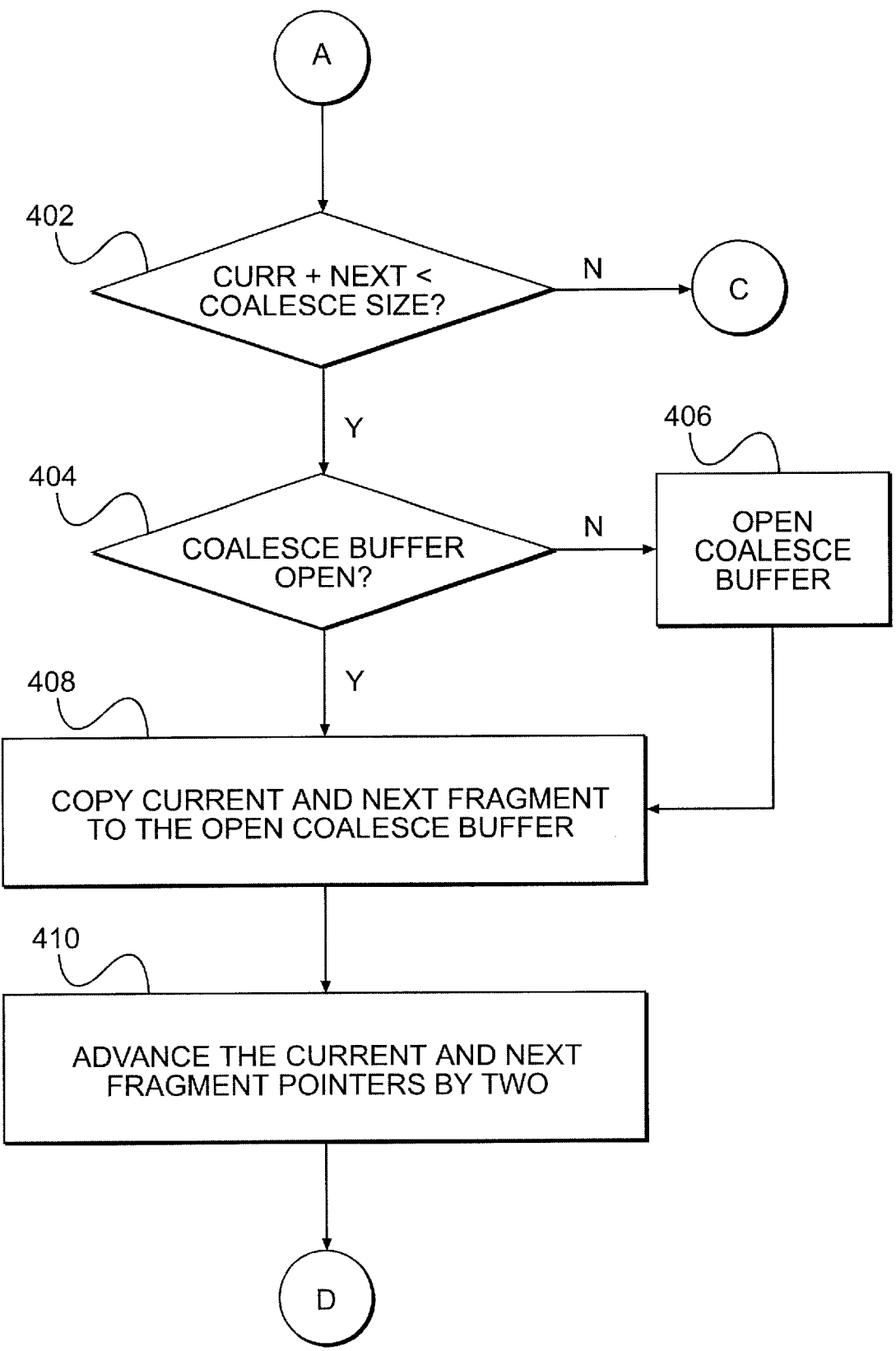
FIG. 4 is a second block flow diagram of the steps performed by a device driver in accordance with one embodiment of the invention.

FIG. 4 is a second block flow diagram of the steps performed by a device driver in accordance with one embodiment of the invention. DDM 218 tests whether the length of the current fragment plus the length of the next fragment is less than a variable COALESCE_SIZE at step 402. If the combined length of the current and next fragments is less than COALESCE_SIZE at step 402, DDM 218 determines whether a coalesce buffer is open at step 404. If a buffer is open at step 404, the current fragment and next fragment are copied to the coalesce buffer at step 408. If a buffer is not open at step 404, DDM 218 opens a coalesce buffer at step 406 prior to executing step 408. DDM 218 advances the current and next fragment pointers by two at step 410, and passes control to step 304 (shown in FIG. 3) as indicated by designator D. If the combined length of the current and next fragments is not less than COALESCE_SIZE at step 402, then control is passed to step 502 (shown in FIG. 5) as indicated by designator C.

Figure 5:
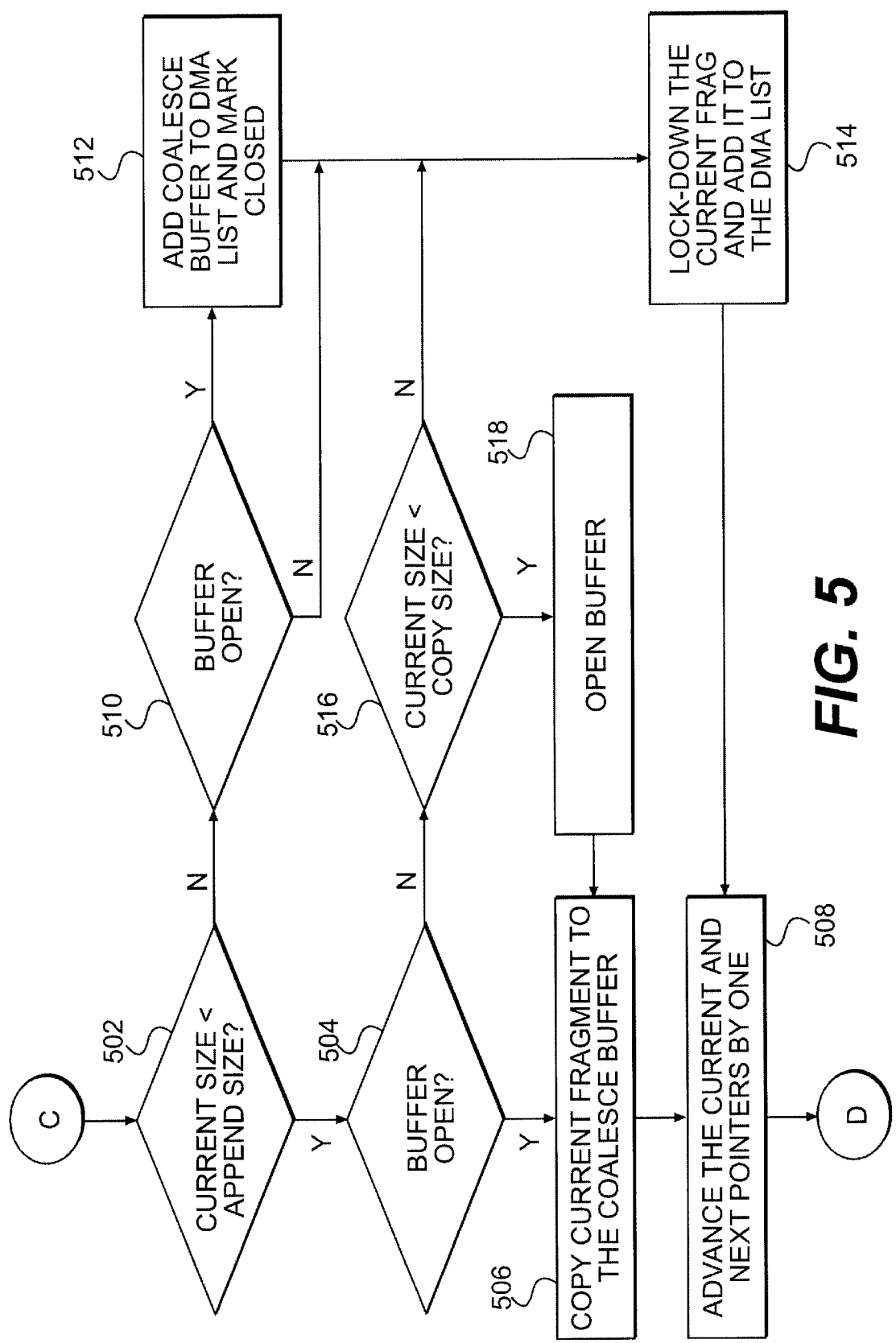
FIG. 5 is a third flow diagram of the steps performed by a device driver in accordance with one embodiment of the invention.

FIG. 5 is a third block flow diagram of the steps performed by a device driver in accordance with one embodiment of the invention. At step 502, DDM 218 tests whether the length of the current fragment is less than a variable APPEND_SIZE. If the length of the current fragment is less than APPEND_SIZE at step 502, DDM 218 tests whether a coalesce buffer is open at step 504. If a buffer is open at step 504, the current fragment is copied to the coalesce buffer at step 506, and the current and next fragment pointers are advanced by one at step 508. Control is then passed to step 304 (shown in FIG. 3) as indicated by designator D.

If the length of the current fragment is not less than APPEND_SIZE at step 502, DDM 218 tests whether a coalesce buffer is open at step 510. If a buffer is not open at step 510, the current fragment is locked-down and added to the DMA list at step 514. If a buffer is open at step 510, the buffer is added to the DMA list and marked as closed at step 512 prior to executing step 514. Step 508 is then executed, and control is passed to step 304 (shown in FIG. 3) as indicated by designator D.

If a buffer is not open at step 504, DDM 218 tests whether the length of the current fragment is less than a variable COPY_SIZE at step 516. If the length of the current fragment is less than COPY_SIZE at step 516, a buffer is opened at step 518, and steps 506 and 508 are executed. If the length of the current fragment is not less than COPY_SIZE at step 516, then steps 514 and 508 are executed.

The variables COALESCE_SIZE, APPEND_SIZE, and COPY_SIZE depend on protocol and design details associated with a particular network. With a substantial number of protocols, fragments tend to be either large (e.g., over 300 bytes) or small (e.g., less then 40 bytes). Because of this tendency, any value for COALESCE_SIZE between 60 and 300 are functionally about the same.

In one advantageous embodiment of the invention, the values for these variables are set as follows:
COALESCE_SIZE=256
APPEND_SIZE=128
COPY_SIZE=32

It can be appreciated, however, that these values are exemplary only and may vary according to a particular implementation or system and still fall within the scope of the invention. The steps described with reference to FIGS. 3, 4 and 5 can be better understood in view of the following examples. The following examples will be explained with reference to FIGS. 6, 7 and 8.

Figure 6:
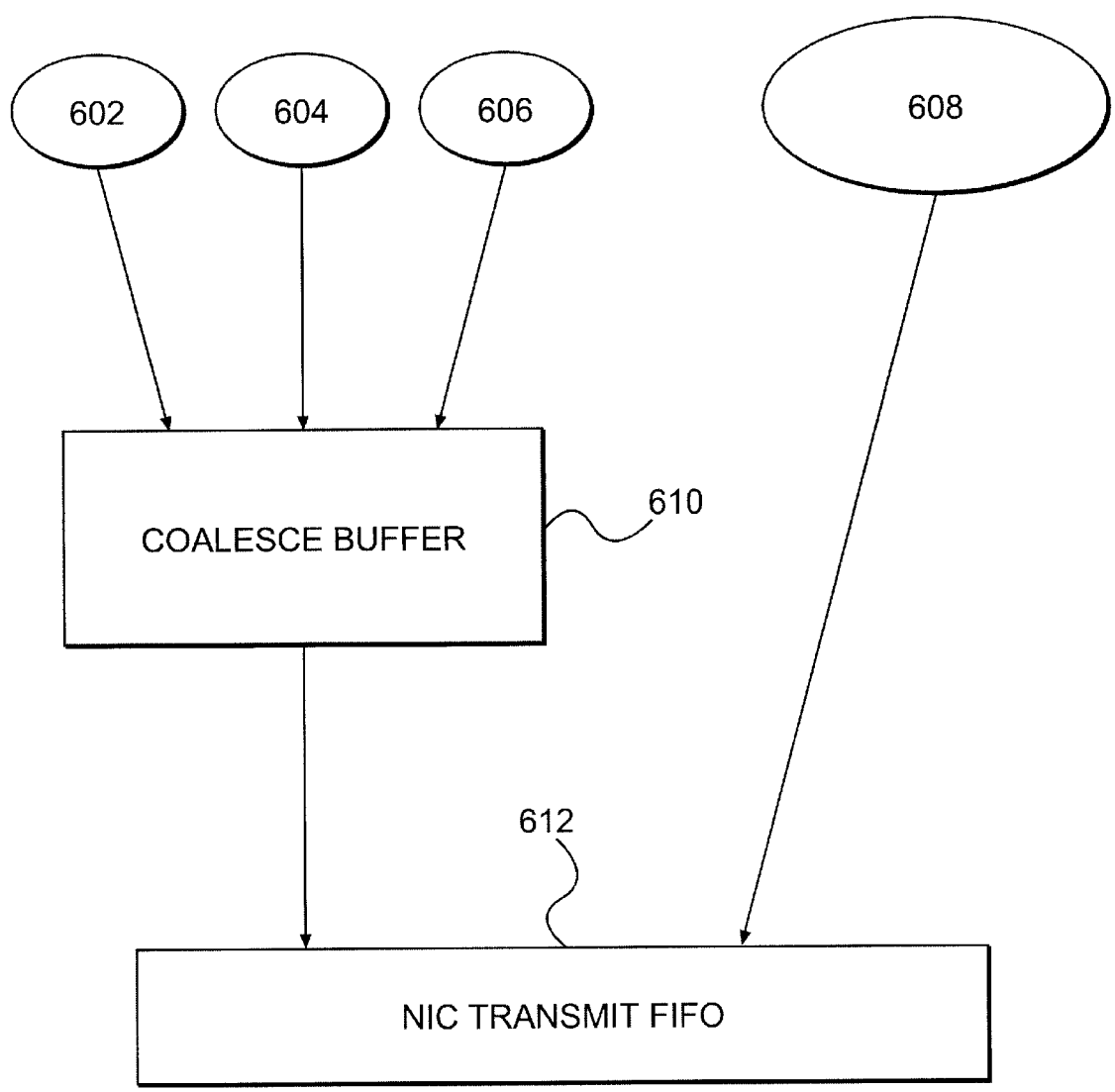
FIG. 6 illustrates a first example in accordance with one embodiment of the invention.

FIG. 6 illustrates a first example in accordance with one embodiment of the invention. In the first example, the packet has fragments 602, 604, 606 and 608 (represented by ovals). Fragments 602, 604 and 606 are relatively small and are copied to a coalesce buffer 610. Fragment 608 is relatively large and is therefore not copied to buffer 610. DMA transfers are initiated for buffer 610 and fragment 608 to a NIC transmit FIFO 612. The number of DMAs that NIC 212 must initiate is reduced from four to two and no relatively large fragments are copied. The number of lock-down calls DDM 218 must make is reduced from four to one.

Figure 7:
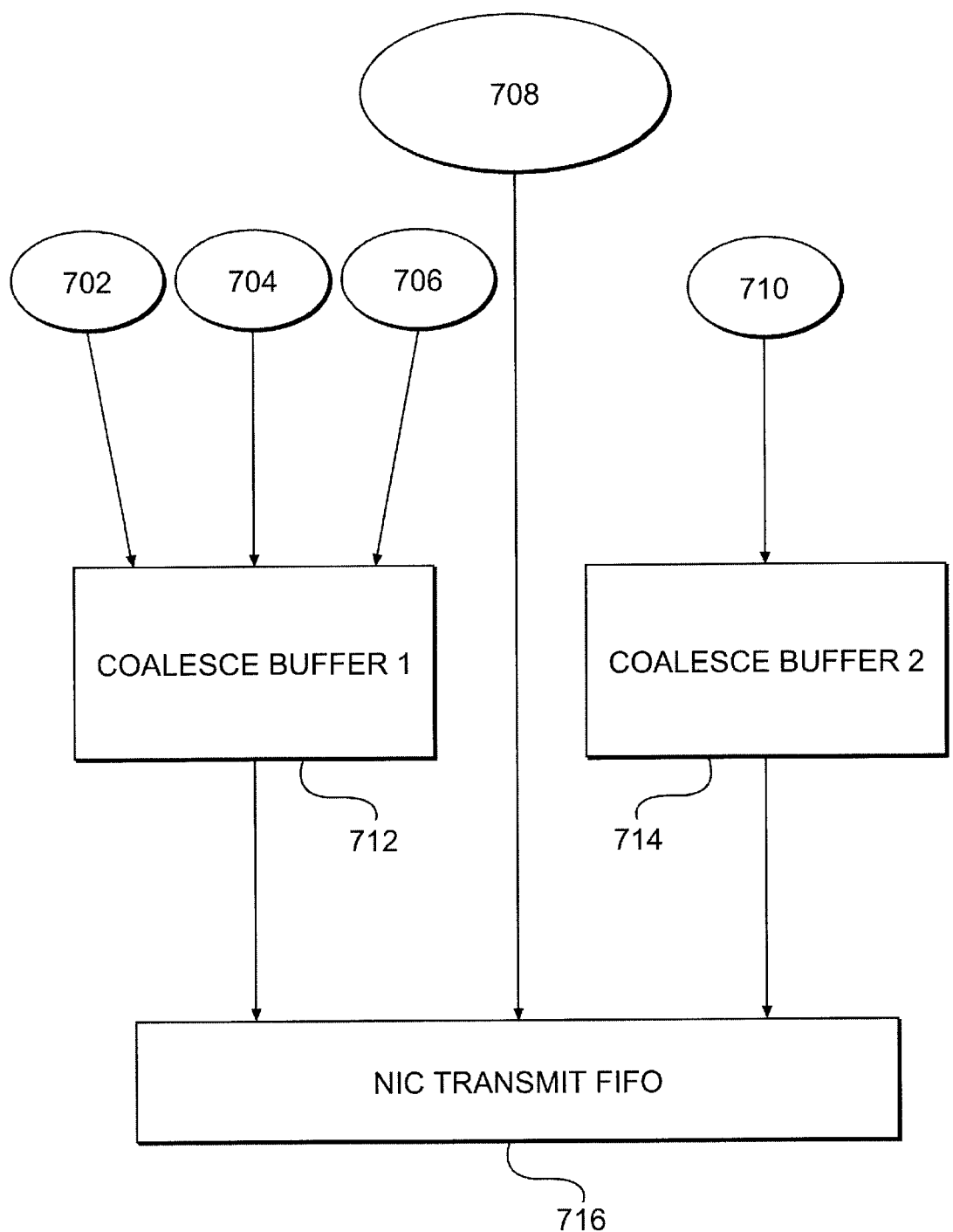
FIG. 7 illustrates a second example in accordance with one embodiment of the invention.

FIG. 7 illustrates a second example in accordance with one embodiment of the invention. In the second example, the packet has fragments 702, 704, 706, 708 and 710. Fragments 702, 704 and 706 are coalesced to a coalesce buffer 712 because they are relatively small and fragment 708 is not because it is relatively large. Fragment 710 is relatively small and is copied to a coalesce buffer 714 because performing a copy here is faster than a memory lock-down. Note that fragment 710 could not be copied to coalesce buffer 712 because the fragment order must be strictly maintained to prevent data corruption. DMA transfers are then initiated for buffer 712 and 714, as well as for fragment 708. The number of DMA transfers that NIC 212 must initiate for this example is reduced from 5 to 3 and the number of lock-down calls is reduced from five to one.

Figure 8:
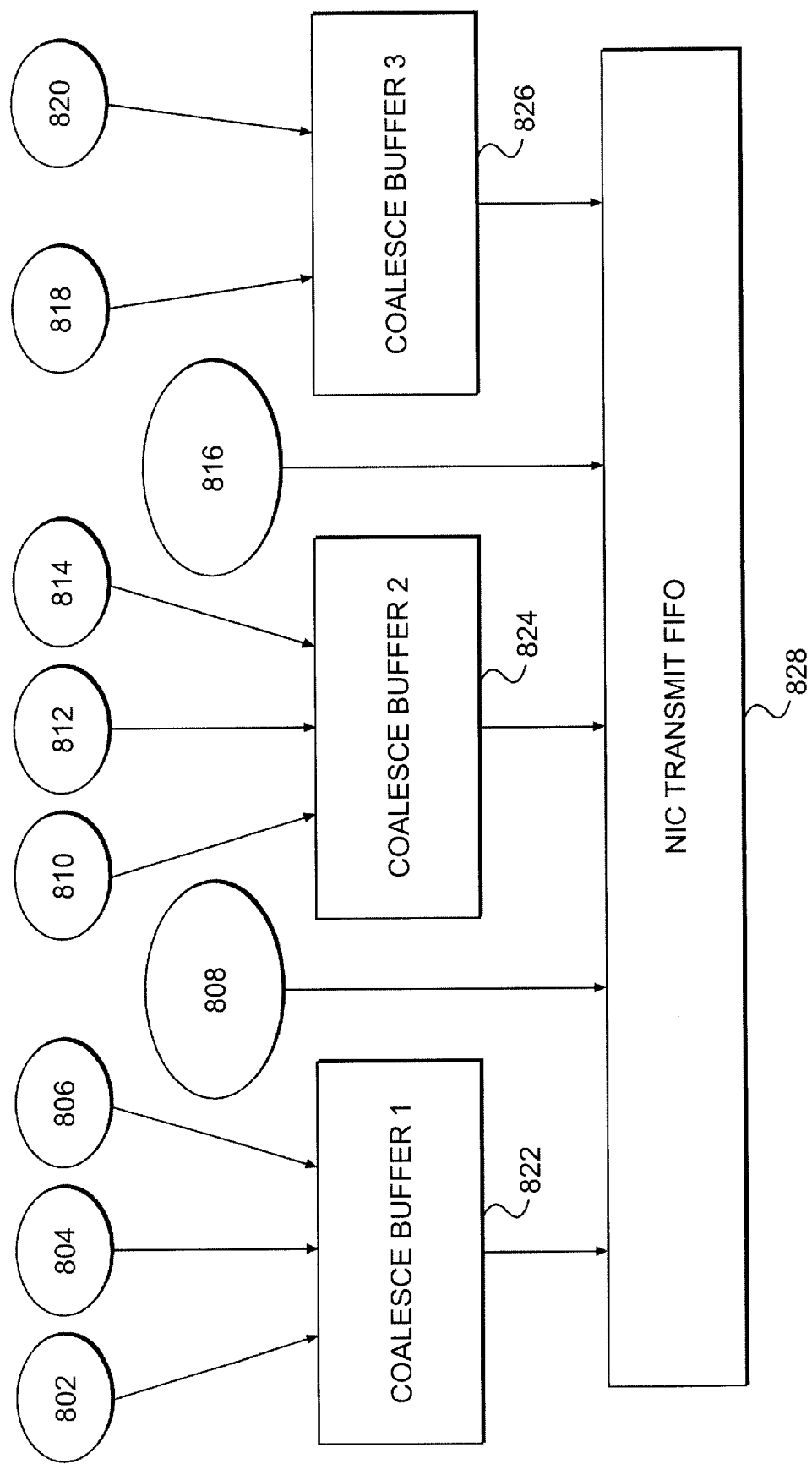
FIG. 8 illustrates a third example in accordance with one embodiment of the invention.

FIG. 8 illustrates a third example in accordance with one embodiment of the invention. In the third example the packet has fragments 802, 804, 806, 808, 810, 812, 814, 816, 818 and 820. Fragments 802–806, 810–814, and 818–820 are coalesced to buffers 822, 824 and 826, respectively. Fragments 808 and 816 are not coalesced because they are relatively large. DMA transfers are initiated for buffers 822, 824 and 826, as well as for fragments 808 and 816. The number of DMA transfers that the driver must initiate is reduced from ten to five and the number of lock-down calls is reduced from ten to two.

Although various embodiments are specifically illustrated and described herein, it will be appreciated that modifications and variations of the present invention are covered by the above teachings and within the purview of the appended claims without departing from the spirit and intended scope of the invention. For example, although the coalesced fragments described with reference to FIGS. 6, 7 and 8 above occurred at the beginning of the first list, it can be appreciated that small fragments that occur anywhere within the first list can be coalesced. Further, a person of ordinary skill in the art will appreciate that any number of coalesce buffers can be used and still fall within the scope of the invention.

What is claimed is:

1. A method for managing data transfers from memory to an input/output device, wherein the data is stored in memory as data fragments, comprising:

receiving a first list of memory locations for said fragments;

selecting a sub-set of fragments for copying to at least one of a first and second buffer based on fragment size;

sending a request to copy said selected sub-set of fragments to said at least one first and second buffer;

sending a request to lock down any unselected fragments; and creating a second list of memory locations for the fragments, said second list comprising memory locations for said at least one first and second buffer and locked down fragments.

2. The method of claim 1, wherein said selecting comprises:

forming a fragment pair from said first list, said fragment pair comprising a first fragment and a second fragment;

determining a first length for said first fragment and a second length for said second fragment;

adding said first and second lengths to form a third length;

comparing said third length to a first predetermined threshold; and selecting said fragment pair for copying to said first buffer if said third length is less than said first predetermined threshold.

3. The method of claim 2, further comprising:

comparing said first length to a second predetermined threshold if said third length is not less than said first predetermined threshold;

determining whether said first buffer is open; and selecting said first fragment for copying to said first buffer if said first length is less than said second predetermined threshold and said first buffer is open.

4. The method of claim 3, further comprising:

comparing said first length to a third predetermined threshold if said first buffer is not open;

opening said second buffer if said first length is less than said third predetermined threshold; and selecting said first fragment for copying to said second buffer if said first length is less than said third predetermined threshold.

5. The method of claim 1, wherein said copying and lock down requests are sent to a memory sub-system.

6. The method of claim 5, further comprising:

receiving said copying request at said memory sub-system; and copying said selected fragments to said at least one first and second buffer.

7. The method of claim 6, further comprising:

receiving said lock down request at said memory sub-system; and locking down said unselected fragments.

8. The method of claim 7, further comprising:

sending said second list to a direct memory access (DMA) controller; and sending a request to transfer to said DMA controller to transfer the fragments from memory to the input/output device in accordance with said second list.

9. The method of claim 8, further comprising:

receiving said second list at said DMA controller; and transferring said fragments from memory to the input/output device using DMA transfers in accordance with said second list.

10. The method of claim 9, further comprising:

receiving said transferred fragments at the input/output device; and sending said received fragments from the input/output device to a network.

11. A machine-readable medium whose contents cause a computer system to manage data transfers from memory to an input/output device, wherein the data is stored in memory as data fragments, by performing:

receiving a first list of memory locations for said fragments;

selecting a sub-set of fragments for copying to at least one of a first and second buffer based on fragment size;

sending a request to copy said selected sub-set of fragments to said at least one first and second buffer;

sending a request to lock down any unselected fragments; and creating a second list of memory locations for the fragments, said second list comprising memory locations for said at least one first and second buffer and locked down fragments.

12. The machine-readable medium of claim 11, wherein said selecting comprises:

forming a fragment pair from said first list, said fragment pair comprising a first fragment and a second fragment;

determining a first length for said first fragment and a second length for said second fragment;

adding said first and second lengths to form a third length;

comparing said third length to a first predetermined threshold; and selecting said fragment pair for copying to said first buffer if said third length is less than said first predetermined threshold.

13. The machine-readable medium of claim 12, further comprising:

comparing said first length to a second predetermined threshold if said third length is not less than said first predetermined threshold;

determining whether said first buffer is open; and selecting said first fragment for copying to said first buffer if said first length is less than said second predetermined threshold and said first buffer is open.

14. The machine-readable medium of claim 13, further comprising:

comparing said first length to a third predetermined threshold if said first buffer is not open;

opening said second buffer if said first length is less than said third predetermined threshold; and selecting said first fragment for copying to said second buffer if said first length is less than said third predetermined threshold.

15. The machine-readable medium of claim 11, wherein said copying and lock down requests are sent to a memory sub-system.

16. The machine-readable medium of claim 15, further comprising:

receiving said copying request at said memory sub-system; and copying said selected fragments to said at least one first and second buffer.

17. The machine-readable medium of claim 16, further comprising:

receiving said lock down request at said memory subsystem; and locking down said unselected fragments.

18. The machine-readable medium of claim 17, further comprising:

sending said second list to a direct memory access (DMA) controller; and sending a request to transfer to said DMA controller to transfer the fragments from memory to the input/output device in accordance with said second list.

19. The machine-readable medium of claim 18, further comprising:

receiving said second list at said DMA controller; and transferring said fragments from memory to the input/output device using DMA transfers in accordance with said second list.

20. The machine-readable medium of claim 19, further comprising:

receiving said transferred fragments at the input/output device; and sending said received fragments from the input/output device to a network.

21. A method for transferring fragments from memory to an input/output device, comprising:

selecting at least one fragment for copying to a buffer based on fragment size;

copying said at least one fragment to said buffer;

locking down any unselected fragments;

transferring said buffer and locked down fragments to the input/output device.

* * * * *